United States Patent
Xydis

(10) Patent No.: US 6,763,315 B2
(45) Date of Patent: Jul. 13, 2004

(54) METHOD OF SECURING ACCESS TO A USER HAVING AN ENHANCED SECURITY PROXIMITY TOKEN

(75) Inventor: Thomas G. Xydis, Manitou Beach, MI (US)

(73) Assignee: Ensure Technologies, Inc., Ann Arbor, MI (US)

(*) Notice: Subject to any disclaimer, the term of this patent is extended or adjusted under 35 U.S.C. 154(b) by 84 days.

(21) Appl. No.: 09/998,659

(22) Filed: Nov. 29, 2001

(65) Prior Publication Data

US 2002/0065625 A1 May 30, 2002

Related U.S. Application Data

(60) Provisional application No. 60/250,293, filed on Nov. 29, 2000.

(51) Int. Cl.$^7$ ............................................. G06M 11/04
(52) U.S. Cl. ...................................................... 702/127
(58) Field of Search ........................... 702/127, 2, 188; 340/870, 825, 572, 10.4, 3.9; 345/156; 370/332, 330, 445; 455/227, 447; 342/318; 324/70, 309; 380/25; 375/202, 265; 713/200

(56) References Cited

U.S. PATENT DOCUMENTS

| | | | | |
|---|---|---|---|---|
| 3,906,166 A | * | 9/1975 | Cooper et al. | 455/437 |
| 4,980,897 A | * | 12/1990 | Decker et al. | 375/265 |
| 5,131,038 A | | 7/1992 | Puhl et al. | 380/23 |
| 5,499,199 A | | 3/1996 | Demas et al. | 364/561 |
| 5,543,797 A | | 8/1996 | Hochstein et al. | 343/42 |
| 5,745,777 A | | 4/1998 | English et al. | 395/800 |
| 5,821,854 A | | 10/1998 | Dorinski et al. | 340/539 |
| 5,842,118 A | | 11/1998 | Wood, Jr. | 455/101 |
| 5,959,530 A | | 9/1999 | Lupien, Jr. et al. | 340/568.1 |
| 5,960,085 A | | 9/1999 | De la Huerga | 380/25 |
| 6,061,389 A | | 5/2000 | Ishifuji et al. | 375/202 |
| 6,070,240 A | | 5/2000 | Xydis | 713/200 |
| 6,088,450 A | | 7/2000 | Davis et al. | 380/25 |
| 6,218,942 B1 | | 4/2001 | Vega et al. | 340/572.1 |
| 6,222,522 B1 | * | 4/2001 | Mathews et al. | 345/156 |
| 6,229,445 B1 | | 5/2001 | Wack | 340/572.7 |
| 6,265,963 B1 | | 7/2001 | Wood, Jr. | 340/10.4 |
| 6,330,450 B1 | * | 12/2001 | Wallstedt et al. | 455/447 |
| 6,445,297 B1 | * | 9/2002 | Nicholson | 340/572.7 |
| 6,459,704 B1 | * | 10/2002 | Jandrell | 370/445 |
| 2001/0007815 A1 | | 7/2001 | Philipsson | 455/41 |
| 2001/0010495 A1 | | 8/2001 | Helms | 340/572.7 |
| 2001/0011940 A1 | | 8/2001 | Williams et al. | 340/3.9 |
| 2001/0011943 A1 | | 8/2001 | Lassle et al. | 340/5.72 |
| 2001/0013830 A1 | | 8/2001 | Garber | 340/572.4 |
| 2001/0016800 A1 | | 8/2001 | Koh | 702/188 |
| 2001/0020897 A1 | | 9/2001 | Takatori | 340/572.7 |
| 2002/0069030 A1 | | 6/2002 | Xydis | 702/176 |
| 2002/0110100 A1 | * | 8/2002 | Itoh | 370/332 |

* cited by examiner

Primary Examiner—John Barlow
Assistant Examiner—Tung S Lau
(74) Attorney, Agent, or Firm—Howard & Howard

(57) ABSTRACT

The subject invention provides a method to determine the proximity of a user (11) having a first electronic device (12) to a second electronic device (14) for allowing the user (11) access to the second electronic device (14). The method includes the steps of transmuting data (44) in a plurality of signals at different frequencies to establish communication between the first electronic device (12) and the second electronic device (14). The method further includes detecting the plurality of signals at the different frequencies with the first electronic device (12). The method is characterized by determining an overall signal strength from the predetermined number of measured signals strengths and comparing the overall signals strength to a predetermined threshold for enabling the second electronic device (14) in response to the overall signal strength being above the predetermined threshold. The subject invention allows for increased security for systems that communicate via frequency hopping spread spectrum by determining the overall signal strength from the measuring of multiple signals detected at different frequencies.

15 Claims, 3 Drawing Sheets

METHOD OF SECURING ACCESS TO A USER HAVING AN ENHANCED SECURITY PROXIMITY TOKEN

RELATED APPLICATIONS

This application claims priority to provisional patent application 60/250,293 which was filed Nov. 29, 2000.

BACKGROUND OF THE INVENTION

1. Field of the Invention

A method of determining proximity of a user having a first electronic device to a second electronic device for allowing the user access to the second device.

2. Description of the Related Art

Computer and network security systems frequently include a first electronic device carried by a user, such as token, badge, or card, and a second electronic device, such as a computer, PDA, laptop, or printer. These devices, in order to make the system more reliable, communicate with frequency hopped spread spectrum signals. The second electronic device partitions data into a plurality of data blocks and spreads the transmission of the data blocks over a plurality of frequency channels. Each of the plurality of data blocks is modulated into a distinct and separate signal. The second electronic device transmits the signal at the radio frequency channel for a predetermined time, or dwell time. Sometimes, a portion of the dwell time contains frequency hop information about the next frequency channel to which the second electronic device will be transmitting on. The second electronic device selects the radio frequency channels in a predetermined pseudo-random pattern. By transmitting the data in blocks and at random radio frequency channels, there is little chance that any unintended recipients will intercept the data, therefore creating a secure transmission. Other devices are required to learn the hopping pattern by tracking the hops of the transmission and synchronizing during each hop. Both devices must then spend an undetermined amount of time attempting to synchronize with one another.

These related art systems also include measuring a signal strength and comparing the measured signal strength to a predetermined threshold. One such reference is U.S. Pat. No. 5,821,854 to Dorinski et al. The '854 Patent to Dorinski et al. discloses a computer and a token carried by a user. The computer and the token each send and receive radio frequency (RF) signals. The computer measures the signal strength of the RF signal emitted by the token and enables the computer in response to the RF signal being above the predetermined threshold. However, the '854 Patent does not measures multiple signal strengths at different frequencies to determine an overall signal strength to compare to the threshold.

Another related art system is U.S. Pat. No. 5,499,199 to Demas et al. The '199 Patent to Demas et al. discloses a system for measuring a distance between a base unit and a remote unit. The remote unit transmits a first RF signal to the base unit and the base transmits a second RF signal to the remote unit upon detection of the first RF signal. The remote unit measures a time interval between transmission of the first and receipt of the second RF signal. The '199 Patent improves the accuracy of the distance by averaging additional time measurements together. However, the system does not measure multiple RF signals at different frequencies.

The related art systems are characterized by one or more inadequacies. The related art systems enable the device when the user may no longer be in proximity to the device thereby allowing for increased information theft. Also, the related art systems do not make accurate RF signal strength measurements when utilizing frequency hopping spread spectrum because of the short transmission periods of the signal.

SUMMARY OF THE INVENTION AND ADVANTAGES

The subject invention provides a method of determining proximity of a user having a first electronic device to a second electronic device for allowing the user access to the second electronic device. The method includes the steps of transmitting data in a plurality of signals at different frequencies to establish communication between the first electronic device and the second electronic device, detecting the plurality of signals at the different frequencies with the first electronic device, and measuring a signal strength for each of a predetermined number of the detected plurality of signals at the different frequencies. The method characterized by determining an overall signal strength from the predetermined number of measured signal strengths and comparing the overall signal strength to a predetermined threshold for enabling the second electronic device in response to the overall signal strength being above the predetermined threshold.

Accordingly, the subject invention overcomes the inadequacies of the related art systems. The subject invention prevents access to unauthorized users by improving the accuracy of the overall measured signal strength, specifically when communicating via frequency hopping spread spectrum signals. Also, the subject invention determines the overall signal strength to disable the device in response to the user leaving the proximity of the device and thereby preventing information theft.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
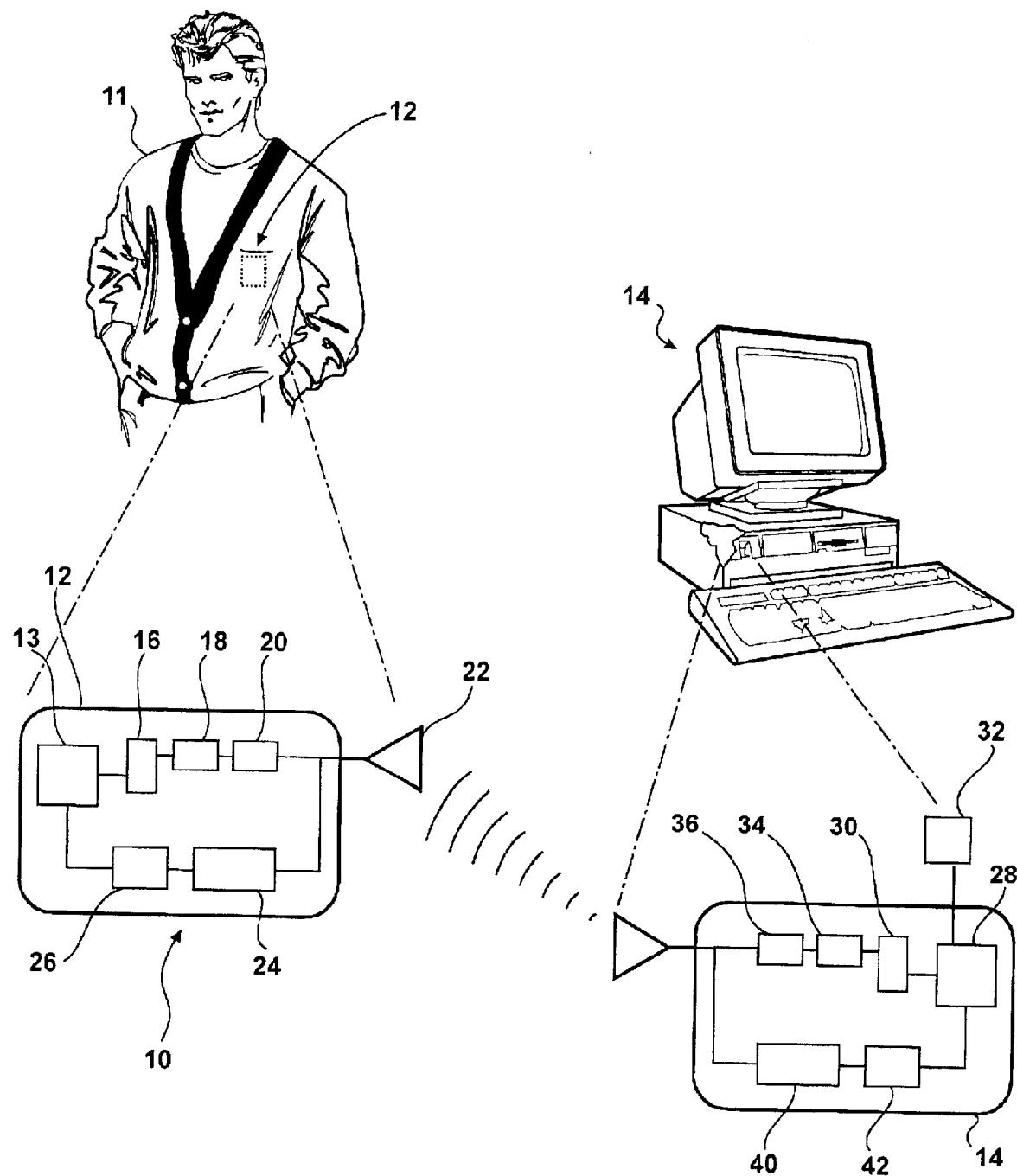
FIG. 1 is a perspective view of a first electronic device and a second electronic device for performing the method of the subject invention.

Referring to the Figures, wherein like numerals indicate like or corresponding parts throughout the several views, a communication system is generally shown at 10 in FIG. 1. The system 10 performs a method to determine the proximity of a user 11 having a first electronic device 12 to a second electronic device 14 for allowing the user 11 access to the second electronic device 14.

The first electronic device 12 is illustrated as a token carried by the user 11 in FIG. 1. However, the token maybe a card, a badge, mobile phone, or other type of identification device known in the art. It should be appreciated that the first electronic device 12 may be any device capable of performing the method as described below. The token includes a first processor 13 connected to an oscillator 16, a modulator 18, a transmitter 20 having a first antenna 22, a receiver 24, and a demodulator 26. The receiver 24 scans the predetermined range of frequency channels for the detection of any transmitted signal.

The second electronic device 14 is illustrated as a computer. It should be appreciated that the second electronic device 14 includes any device capable of performing the method as described below, such as a printer, a mouse, a PDA, mobile phone, or similar device. The computer includes a second processor 28 connected to a data storage 32, an oscillator 30, a modulator 32, a transmitter 36 having a second antenna 38, a receiver 40, and a demodulator 42. Both the first and the second electronic devices 12, 14 are equipped to transmit and receive the RF signals using a pseudo-noise generator stored within the first processor 13 and the second processor 28.

Figure 2:
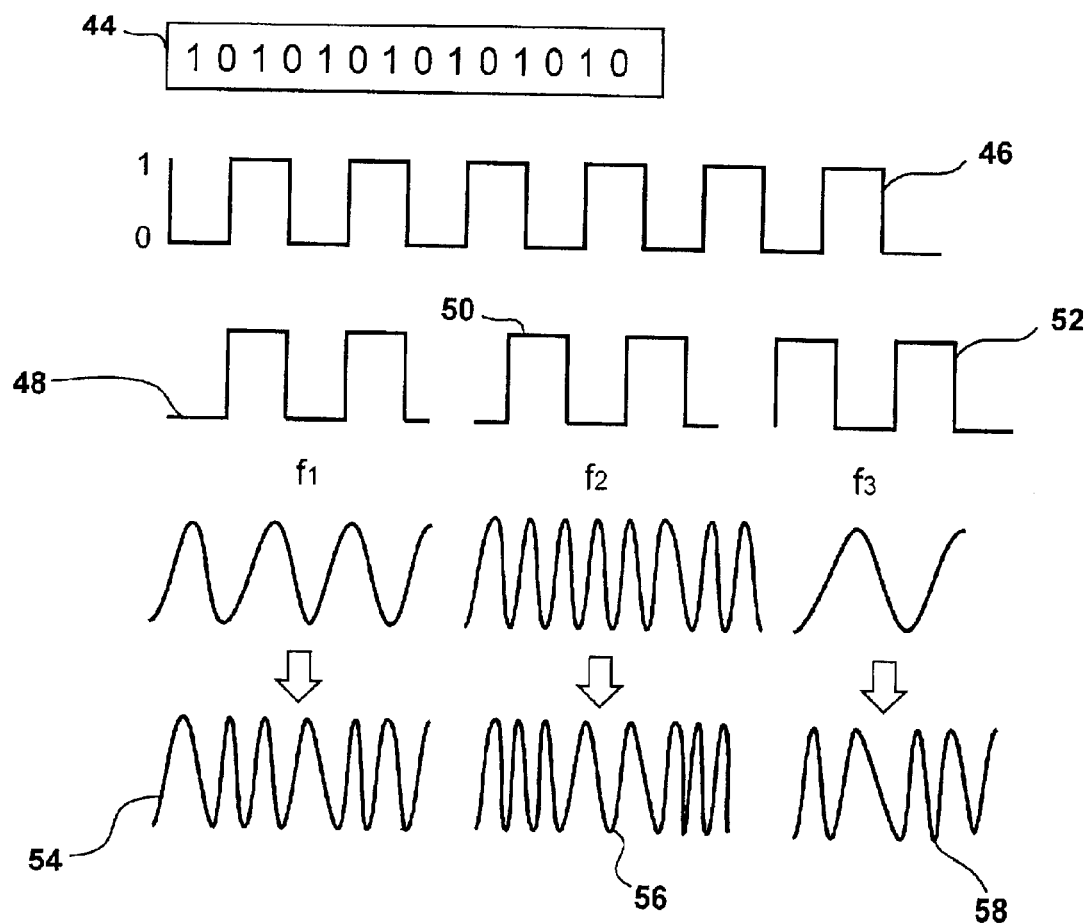
FIG. 2 is a schematic view of spreading data blocks over a plurality of frequency channels.

Referring to FIG. 2, the second electronic device 14 transmits data 44 to the first electronic device 12. The computer sends data 44 stored within the data storage 32 to the second processor 28. The data 44 is illustrated as binary code 46 having a value of "one" or "zero". The second processor 28 partitions the data 44 into a plurality of data blocks 48, 50, 52 and selects a radio frequency channel from the oscillator 30 to produce a radio frequency (RF) carrier signal. The oscillator 30 is able to produce the RF carrier signal having any frequency requested by the second processor 28. A range 60 for frequency hopping is predetermined and programmed into the second processor 28 with each hop corresponding to an individual frequency channel. The oscillator 30 produces the carrier signal having a first frequency f1, then changes to a second frequency f2, and then a third frequency f3.

FIG. 2 further shows a first data 44 block being modulated with the carrier signal at the first frequency f1, a second data 44 block being modulated at the second frequency f2, and a third data 44 block being modulated with the third frequency f3. Various modulation techniques can be used. For example if FSK is used then the resulting signals have an increased frequency when the binary number of the data 44 block is a one. The binary number of zero produces a portion of the signal having a lower frequency. By transmitting the data blocks 48, 50, 52 at pseudo-random frequency channels, the reliability of the communications is improved as the signal is not easily jammed or disrupted.

Figure 3:
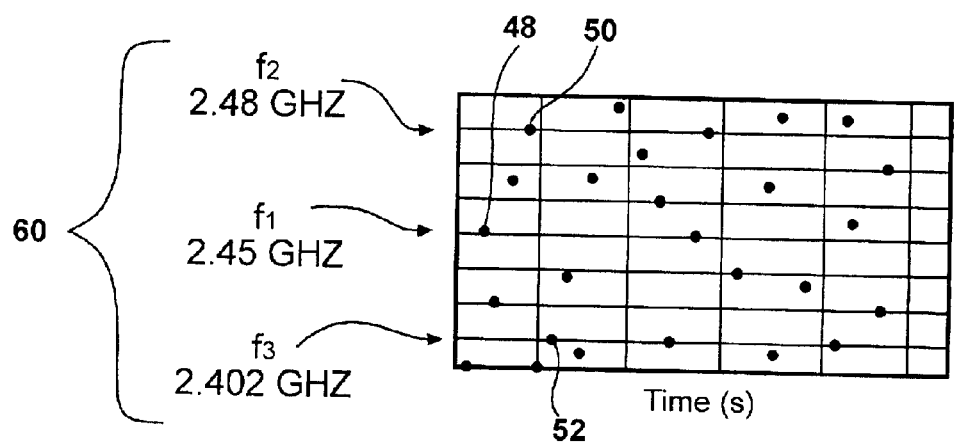
FIG. 3 is a schematic view of a hopping pattern used to transmit the data blocks via frequency hopped spread spectrum signals.

Referring to FIG. 3, the second processor 28 spreads the data blocks 48, 50, 52 over a plurality of frequency channels f1, f2, f3 within the predetermined range, in a pseudo-random manner. In the preferred embodiment, the predetermined range has an upper limit of 2.5 GHz and a lower limit of 2.4 GHz. The predetermined range is divided into seventy-nine 1 MHz channels between the upper and lower limit, where each of the channels is used for transmitting the data 44. The data block 48, 50, 52 and the carrier signals f1, f2, f3 are then combined in the modulator 34 and the result is a signals 54, 56, 58 for transmittance through the second antenna 38 at the selected frequency to the first electronic device 12. Each point on the figure represents the transmission of a signal from the second electronic device 14 at a different frequency within the frequency range 60.

The subject invention utilizes a communication technique referred to as frequency hopping spread spectrum to establish communication between the first and the second electronic devices 12, 14. Spread spectrum is a type of modulation that scatters data 44 transmissions across the available frequency band in a 'pseudo random' pattern. The data 44 is transmitted in a plurality of radio frequency (RF) signals. Spreading of the data 44 requires a pseudo noise (PN) code generator to select the frequencies for transmission and reception. The PN code generator hops the system over a band of frequencies. The frequency hopped system can use analog or digital modulation and can be designed using conventional narrow band radio techniques. De-hopping in the receiver 24 is done by a synchronized pseudo noise code generator to that of the transmitter 20.

Frequency hopping takes the data 44 signal and modulates it with a carrier signal that hops from frequency to frequency as a function of time over a wide band of frequencies. With frequency hopping spread spectrum, the carrier frequency changes periodically. A frequency hopping device, for example, will hop the carrier frequency over the 2.4 GHz frequency band between 2.4 GHz and 2.483 GHz.

Frequency hopped spread spectrum communication makes the signal resistant to noise, interference, and security breaches. Spread spectrum enables multiple users 11 to share radio frequencies at the same time, without interfering with each other. The transmitted signal is spread over a frequency much wider than the minimum bandwidth required to send the signal. The frequency band is divided into channels and increasing the transmitted signal bandwidth results in an increased reception of the signal. Process gain is the concentration of signal strength in a given direction. In dividing the data 44 into channels, Claude Shannon's equation for channel capacity is as follows:

$$C = W \log 2(1 + S/N)$$

Where, C=Channel capacity in bits, W=Bandwidth in Hertz, S=Signal Power, and N=Noise Power. By increasing W in the equation, the S/N may be decreased without decreased system performance.

The process gain (GP) is what actually provides increased system performance without requiring a high S/N. This is described mathematically as:

$$GP = BWRF/RINFO$$

Where, BWRF=RF Bandwidth in Hertz and RINFO= Information rate in bits/second. Signal strength declines with distance, but process gain is a constant that is not affected by distance.

A hopping code, generated by the PN code generator, determines the frequencies the radio will transmit and in which order. To properly receive the signal, the receiver 24 must be set to the same hopping code and listen to the incoming signal at the right time and at the correct frequency. FCC regulations require 75 or more frequencies per transmission channel with a maximum dwell time of 400 ms. If the device encounters interference on one frequency, then the device will retransmit the signal on a subsequent hop on another frequency. Because of the nature of its modulation technique, frequency hopping can achieve up to 2 Mbps data rates.

It is possible to have operating devices use spread spectrum within the same frequency band and not interfere, assuming each device uses a different hopping pattern. While one device is transmitting at one particular frequency, the other device is using a different frequency. A set of hopping codes that never use the same frequencies at the same time are considered orthogonal. The FCC's requirement for number of different transmission frequencies allows frequency hopping devices to have many non-interfering channels. Interference refers to anything that blocks or degrades the RF signal.

The RF signal strength maybe decreased by interference from other users, intentional like jamming or unintentional, by the signal having the bandwidth which is superimposed to the signal. The more channels the signal is spread over, the more difficult and less likely this type of interference will be.

Another type of interference comes from multiple access, which occurs when the same spectrum is shared by a set of coordinated users. Spread spectrum systems allow for a Code Division Multiple Access (CDMA) system, that is a way of allowing more users to communicate at the same time in the same frequency band. In a CDMA system, each user has its own code, therefore the signal can be recovered by knowing the user code and thereby preventing interference between the multiple users.

Yet another type of interference is from the transmitted signal itself. The signal maybe reflected thereby creating a signal strength, which is not indicative of the actual signal strength. Constructive interference allows for an amplitude of the signal to be combined and results in the signal strength being greater than the actual value. Destructive interference allows the signal to be combined with an out of phase signal and thereby resulting in a signal strength less than the actual measurement.

In order for the communication between the devices to be established, signals transmitted between devices must have a relatively low signal to noise ratio. Some factors which influence the signal to noise ratio include signal strength, distance, and interference. Signal strength is the power received by the receiver. The stronger the source, the stronger the signal strength which allows for better reception over long distances. Also, as the distance between devices increase, the signal strength declines and increases the potential for interference. Interference may result from other nearby RF activity, as described above.

The transmission of the data 44 is typically transmitted on a carrier. The carrier hops according to a known sequence over a number of frequencies inside the spreading bandwidth W. The frequency hopping can be slow (SFH), if one or more data bits are transmitted within one frequency hop, or fast (FFH), if one data bit is divided over more frequency hops.

Figure 4:
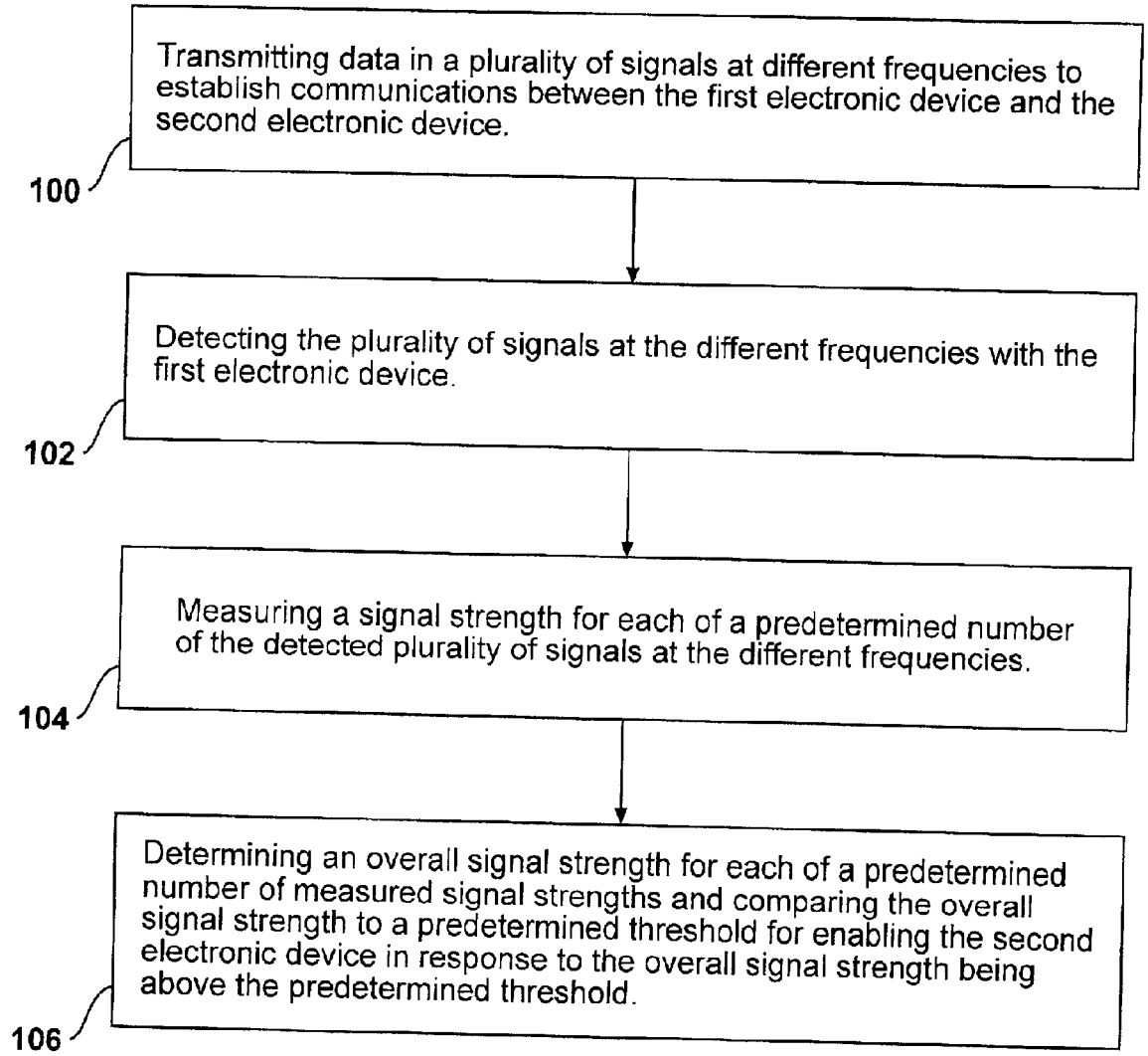
FIG. 4 is a flowchart depicting the method of the subject invention.

The subject invention provides a method of determining proximity of the user 11 having the first electronic device 12 to the second electronic device 14 for allowing the user 11 access to the second electronic device 14 as depicted in FIG. 4. The method includes transmitting data 44 in a plurality of signals at different frequencies to establish communication between the first electronic device 12 and the second electronic device 14 in step 100. The data 44 must be partitioned into a plurality of data blocks 48, 50, 52 for transmittance of the data blocks 48, 50, 52 over wireless connections to the first electronic device 12. After the data 44 has been partitioned, the data blocks 48, 50, 52 are spread over a plurality of radio frequencies f1, f2, f3 such that each of the data blocks 48, 50, 52 is transmitted at a different frequency for secure transmission between the first electronic device 12 and the second electronic device 14. Next, the plurality of data blocks 48, 50, 52 are modulated at the plurality of radio frequencies to establish a plurality of signals.

The method further includes detecting the plurality of signals at the different frequencies with the first electronic device 12 in step 102. For example, the second electronic device 14 transmits and hops frequencies up to 1600 times per second. The first electronic device 12 must detect the transmitted signals to recover the data 44 which has been partitioned, as described above. As the first electronic device 12 detects the signals, the first electronic device 12 also measures a signal strength for each of a predetermined number of the detected plurality of signals at the different frequencies in step 104. For instance, of the 1600 signals detected, the first electronic device 12 may measure the signal strength of the every $200^{th}$ signal. Therefore, eight signal measurements are made per second and the first electronic device 12 may assign the predetermined number to be forty signal measurements. The measuring of the signal strength may be accomplished by any methods known to one skilled in the art of measuring signal strength.

If the predetermined number of signal strengths measurements is every signal detected (in the above example all 1600 signals), the signal strength value may be recorded only at a predetermined interval, for example every $200^{th}$ signal. In this case, some averaging (or low pass filtering) may be done over the intervening signal strength measurements and this averaged value sampled at the predetermined interval, alternately, the system may select the maximum signal over all the signal strength measurements in each predetermined interval.

Often, the first electronic device 12 is not communicating very much data perhaps only an ID number sufficient to notify the second electronic device 14 that it remains in close proximity. In that case the first electronic device 12 and the second electronic device 14 may decide to only communicate on a predetermined number of frequency steps, less then the normal rate. For example, they may decide to only communicate 8 times per second (out of the 1600 times available) to conserve power.

The method is characterized by determining an overall signal strength from the predetermined number of measured signal strengths and comparing the overall signal strength to a predetermined threshold for enabling the second electronic device 14 in response to the overall signal strength being above the predetermined threshold. The overall signal strength is determined in step 106 in FIG. 4. Continuing the example of measuring every $200^{th}$ signal, since the first electronic device 12 has assigned the predetermined number to forty, when forty signals are measured, the overall signal strength is determined. Then the overall signal strength is compared to the predetermined threshold. If the overall signal strength is above the predetermined threshold, the second electronic device 14 is enabled. If the overall signal strength falls below the predetermined threshold, the second electronic device 14 is disabled.

Preferably, the signal strength of the RF signal is measured in decibels. The system measures signal strength relative to some type of reference signal. One type of measurement power is decibels relative to 1 mW dBm.

The method further includes the step of transmitting the overall signal strength from the first electronic device 12 to the second electronic device 14 for comparing to the predetermined threshold and enabling the second electronic device 14 in response to the signal strength being above the predetermined threshold. After the first electronic device 12 determines the overall signal strength, the overall signal strength is transmitted and detected by the second electronic device 14. The second electronic device 14 then compares the overall signal strength to the predetermined threshold programmed into the second processor. If the overall signal strength is above the predetermined threshold, the second electronic device 14 is enabled to allow access to the user 11.

Alternately, the first electronic device 12 may determine the overall signal strength and then compare to the predetermined threshold. The first electronic device 12 then generates a strength code, which is a function of whether the overall signal strength is above or below the predetermined threshold. The strength code is transmitted to the second electronic device 14 and the second electronic device 14 determines whether to be enabled or disabled based upon the strength code transmitted. Also, to prevent security breaches, the second electronic device may perform additional steps with the strength code to determine the resulting enablement.

The step of determining the overall signal strength is further defined as averaging the signal strength measurements for the predetermined number of detected signals to establish the overall signal strength. For example, the first electronic device 12 may measure every $200^{th}$ signal until forty signal strength measurements are made. Then, the first electronic device 12 takes the average of the forty signals and compares the average to the predetermined threshold for enabling the second electronic device 14.

In another embodiment of the subject invention, the step of determining the overall signal strength is further defined as isolating the detected signal having the maximum measured signal strength from all the predetermined number of detected signals to establish the overall signal strength. According to this embodiment, as the first electronic device 12 measures forty signal strengths and compares each measurement to one another to isolate the maximum signal strength. If the maximum signal strength is above the predetermined threshold, then the second electronic device 14 is enabled.

Yet another embodiment of the subject invention provides the step of determining the overall signal strength by converting each of the signal strength measurements for each of the predetermined number of detected signals to logarithmic values and averaging the logarithmic values of all the predetermined number of detected signals to establish the overall signal strength. This occurs if the signal strength is reported in decibels. The averaged logarithmic value is then compared to the predetermined threshold and enables the second electronic device 14 in response to the logarithmic value being above the predetermined threshold. By converting the signal strength measurement, the system is able to compare measurements on a similar scale and provides a more accurate measurement.

The subject invention further includes the step of scanning the predetermined number of detected signals during a time interval and determining the overall signal strength from the measured signal strengths during the time interval. In one embodiment, the first electronic device 12 measures signal strength during the time interval and isolates the detected signal having the maximum measured signal strength from all the predetermined number of detected signals to establish the overall signal strength. In another embodiment, the system averages the signal strength measurements measured during the time interval to establish the overall signal strength. For example, if the predetermined number of signal is programmed into the first electronic device 12 to be every signal, the first electronic device 12 will measure the signal strength for all detected signals during the time interval. The measured signal strengths may then be utilized to determine the overall signal strength, as described above.

The time interval which is selected depends upon the level of security which is necessary to protect the second electronic device 14. For instance, if the user 11 moves about the second electronic device 14 and frequently leaves the proximity of the second electronic device 14, the time interval should be programmed to a short time interval, such as five seconds. Therefore, the first electronic device 12, every five seconds, will calculate the overall signal strength from the measured signal strengths. If the user 11 remains in the proximity for longer periods, the first electronic device 12 may be programmed to have a larger time interval, such as one minute. Then every minute, the first electronic determines the overall signal strength based upon the measured signal strengths. As the time intervals become larger, the first electronic device 12 may not need to measure as many signals to determine the proximity of the user 11 to the second electronic device 14. Therefore, the predetermined number would be less than the all detected signals for the time interval.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of determining proximity of a user (11) having a first electronic device (12) to a second electronic device (14) for allowing the user (11) access to the second electronic device (14), said method comprising the steps of:

partitioning data (44) stored within the second electronic device (14) into a plurality of data blocks (48), (50), (52) for transmittance of the data blocks (48), (50), (52) over wireless connections to the first electronic device (12);

spreading the plurality of data blocks (48), (50), (52) over a plurality of radio frequencies (f1, f2, f3) such that each of the data blocks (48), (50), (52) is transmitted at a different of the frequencies (f1, f2, f3) for secure transmission between the first electronic device (12) and the second electronic device (14);

transmitting the data blocks (48), (50), (52) in a plurality of signals at the different frequencies (f1, f2, f3) to establish communication between the first electronic device (12) and the second electronic device (14);

detecting the plurality of signals at the different frequencies with the first electronic device (12);

measuring a signal strength for each of a predetermined number of the detected plurality of signals at the different frequencies (f1, f2, f3);

determining an overall signal strength from the predetermined number of measured signal strengths and comparing the overall signal strength to a predetermined threshold; and enabling the second electronic device (14) in response to the overall signal strength being above the predetermined threshold and disabling the second electronic device (14) in response to the overall signal strength being below the predetermined threshold.

2. A method as set forth in claim 1 wherein the step of determining the overall signal strength is further defined as averaging the signal strength measurements for the predetermined number of detected signals to establish the overall signal strength.

3. A method as set forth in claim 1 wherein the step of determining the overall signal strength is further defined as isolating the detected signal having the maximum measured signal strength from all the predetermined number of detected signals to establish the overall signal strength.

4. A method as set forth in claim 1 wherein the step of determining the overall signal strength is further defined as converting each of the signal strength measurements for each of the predetermined number of detected signals to logarithmic values and averaging the logarithmic values of all the predetermined number of detected signals to establish the overall signal strength.

5. A method as set forth in claim 1 further including the step of scanning the predetermined number of detected signals during a time interval and determining the overall signal strength from the measured signal strengths during the time interval.

6. A method as set forth in claim 5 wherein the determining of the overall signal strength is further defined as isolating the detected signal having the maximum measured signal strength from all the predetermined number of detected signals to establish the overall signal strength.

7. A method as set forth in claim 5 wherein the determining of the overall signal strength is further defined as averaging the signal strength measurements measured during the time interval to establish the overall signal strength.

8. A method as set forth in claim 1 further including the step of transmitting the overall signal strength from the first electronic device (12) to the second electronic device (14) for comparing to the predetermined threshold and enabling the second electronic device (14) in response to the signal strength being above the predetermined threshold.

9. A method as set forth in claim 1 further including the step of transmitting a strength code from the first electronic device (12) to the second electronic device (14) in response to the overall signal strength being above the predetermined threshold and enabling the second electronic device (14) upon detecting the strength code.

10. A method as set forth in claim 1 wherein the step of transmitting the data (44) in the plurality of signals is further defined as modulating the plurality of data blocks (48), (50), (52) at the plurality of radio frequencies to establish a plurality of signals.

11. A method as set forth in claim 1 further including the step of scanning the predetermined number of detected signals during a time interval and determining the overall signal strength from the measured signal strengths during the time interval.

12. A method as set forth in claim 11 wherein the determining of the overall signal strength is further defined as isolating the detected signal having the maximum measured signal strength from all the predetermined number of detected signals to establish the overall signal strength.

13. A method as set forth in claim 11 wherein the determining of the overall signal strength is further defined as averaging the signal strength measurements measured during the time interval to establish the overall signal strength.

14. A method as set forth in claim 13 further including the step of transmitting the overall signal strength from the first electronic device (12) to the second electronic device (14) for comparing to the predetermined threshold and enabling the second electronic device (14) in response to the signal strength being above the predetermined threshold.

15. A method as set forth in claim 13 further including the step of transmitting a strength code from the first electronic device (12) to the second electronic device (14) in response to the overall signal strength being above the predetermined threshold and enabling the second electronic device (14) upon detecting the strength code.

* * * * *